Figures 1, 2:
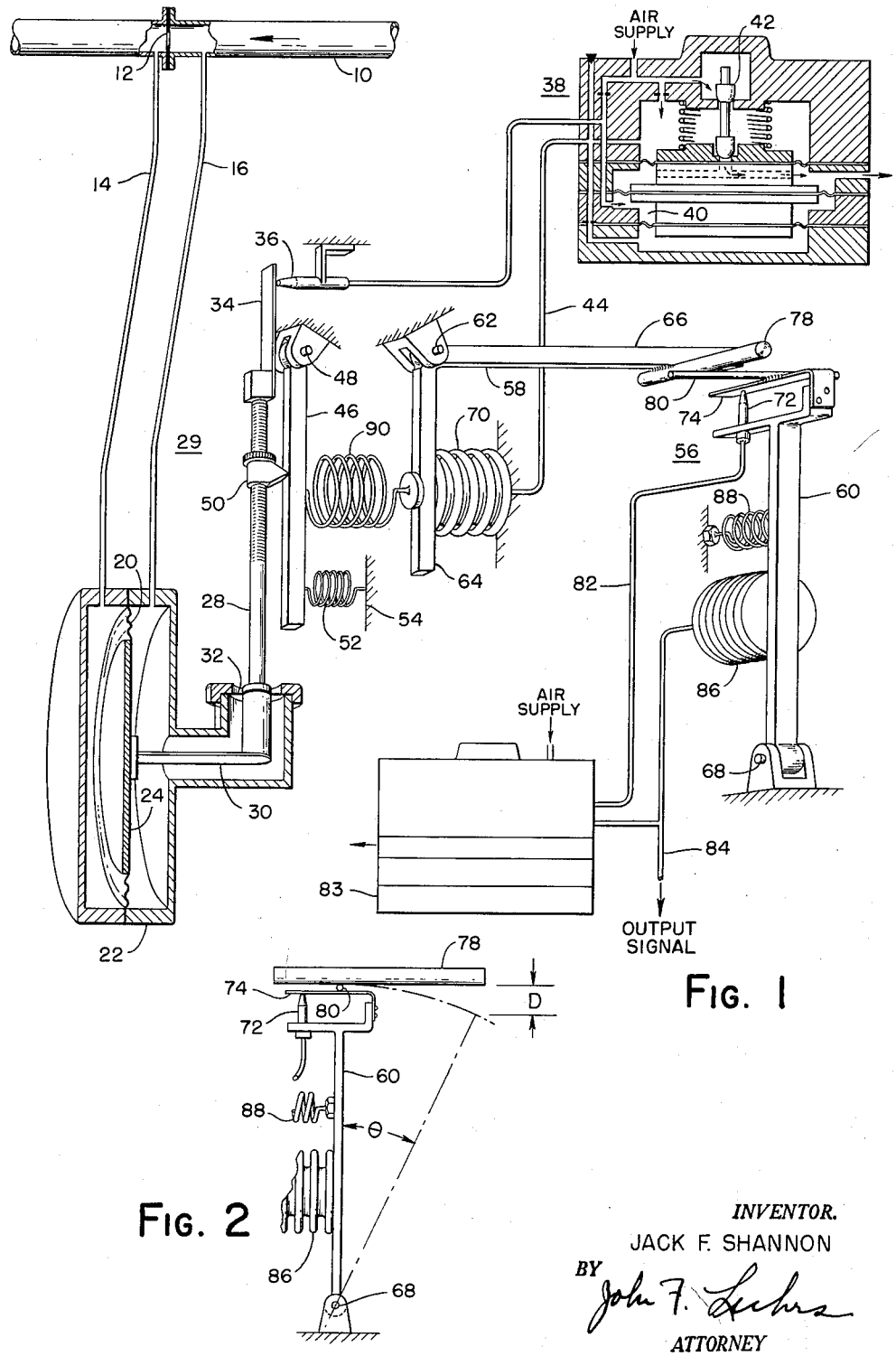

May 30, 1961        J. F. SHANNON        2,986,151

FLOW MEASURING DEVICE

Filed April 21, 1958

*INVENTOR.*
JACK F. SHANNON
BY
*ATTORNEY*

United States Patent Office 2,986,151
Patented May 30, 1961

2,986,151
FLOW MEASURING DEVICE

Jack F. Shannon, Euclid, Ohio, assignor to Bailey Meter Company, a corporation of Delaware Filed Apr. 21, 1958, Ser. No. 729,943

5 Claims. (Cl. 137—85)

This invention relates to devices for producing signals representative of the magnitude of a variable, and more particularly to devices for producing a signal representative of the flow rate of a fluid.

One of the most common methods for measuring the flow rate of a fluid in a closed conduit is to position a restriction in the conduit and measure the pressure differential across the restriction. Apparatus is generally provided for producing a signal proportional to the measured pressure differential to provide a manifestation of the flow rate. The signal thus produced may be utilized to effect control of the fluid flow or to provide an indication of the flow rate.

The disadvantage of the above system is the fact that the pressure differential across the restriction varies as the square of the flow rate through it. Thus, the signal produced as a manifestation of the flow rate has a linear relationship with the pressure differential, but a nonlinear relationship with the flow rate. Therefore, some type of compensator is usually provided to extract the square root of the signal.

Due to its simplicity and ease of adjustment, a force balance system is desirable for measuring the pressure differential across the restriction. This system generally comprises a diaphragm for sensing the differential pressure and applying a proportional force to a force balance beam. The beam when deflected by the force is effective to produce an electrical or pneumatic output signal which is utilized to produce a rebalancing force on the beam and restore it to its original position. Thus, the output signal is a measure of the force required to balance the force on the beam established by the pressure differential.

Since the output signal from such a force balance system varies as the square of the flow rate, it has been customary to feed the output signal into a square root extractor to obtain a signal linear with the flow rate. Such square root extracting devices have taken a number of forms. One of the more common types is the well-known motion balance system wherein an input motion proportional to the magnitude of an output signal is balanced by an output motion effective to establish an output signal. A non-linear relationship between two motions may be introduced by a cam or some other means to effect an output signal from the motion balance system proportional to the square root of the input signal.

Thus, in the past, flow measurement by means of a force balance system has involved the use of a separate motion balance system for extracting the square root of the output signal from the force balance system. While such apparatus will effect a flow measurement and a manifestation of the flow rate with reasonable accuracy, it is subject to one disadvantage which has prevented it from achieving an accuracy sufficient to classify it as a precision measuring system. This known disadvantage is the fact that the input motion of the square root extractor or motion balance system is directly proportional to the output signal of the force balance system and thus subject to any errors in the output signal. If the level of the output signal should vary as a result of some malfunction, the error will be carried through the square root extractor. For example, in a pneumatic system where an output pressure is developed representative of the pressure differential across the restriction, the output pressure is applied to an expansible element engaging the force balance beam to balance the input force. In such a system the balancing force is always proportional to the measured pressure differential, but the output pneumatic pressure establishing the balancing force may vary as a result of variations in the effective area of the expansible element. I have found that this well known error can be eliminated by combining the motion balance system with the force balance system and establishing an input motion in the motion balance system directly proportional to the rebalancing force applied to the force balance system and independent of the output signal from the force balance system. Accordingly, it is an object of this invention to produce an input motion in a motion balance system directly proportional to the rebalancing force in a force balance system.

Another object of the invention is to combine a force balance system and a motion balance system to produce a flow measuring device of extremely high accuracy.

In one embodiment of the invention, a force balance beam is arranged to be deflected by an input force representative of a variable such as pressure differential. Movement of the force balance beam is effective to establish an output signal which is transduced into movement of an input beam of a motion balance system. A yieldable connection is provided between the force balance beam and input beam of the motion balance system to apply a rebalancing force to the force balance beam proportional to the movement of the input beam. With this arrangement, the input motion of the motion balance system is directly proportional to the rebalancing force applied to the force balance beam and independent of the output pressure developed thereby.

The motion balance system is provided with an output beam effective to balance the motion of the input beam and establish an output signal proportional to the output motion. The input and output beams are arranged to render the output motion and signal proportional to the square root of the input motion and thus proportional to the square root of the variable applied to the force balance beam.

Other objects and advantages will become apparent from the following description taken in connection with accompanying drawing wherein:

Fig. 1 is a generally schematic illustration of a differential pressure transmitter embodying this invention and Fig. 2 is a diagrammatic illustration of the relative movement of the two parts shown in Fig. 1.

Referring now to Fig. 1 of the drawing, there is shown a conduit 10, containing a fluid flowing in the direction indicated by the arrow. To establish a pressure differential indicative of the flow rate through the conduit 10, a restriction comprising an orifice plate 12 is installed in the conduit 10, and pipes 14, 16 are connected to the conduit 10 to sense the pressure drop produced.

As mentioned in the introductory remark, the pressure drop across such a restriction is proportional to the square of the flow rate. As previously mentioned, this pressure is transduced into a signal by means of a force balance system and the square root is extracted in a motion balance system. The two systems are interconnected so that the input motion to the motion balance system is directly proportional to the balancing force in the force balance system.

The pressure differential across the restriction 12 as sensed by the pipes 14, 16 is impressed across a flexible diaphragm 20 positioned within a casing 22 and having a center plate 24 movable in response to variations in the differential pressure. Movement of the diaphragm 20 and center plate 24 is transmitted to one end of a force beam 28 of a force balance system indicated generally by the reference numeral 29 by means of a rod 30 extending from the center plate 24 and connected to the lower end of the beam 28. The beam 28 extends through a flexible sealing means comprising a diaphragm 32 which in addition to sealing the high pressure chamber of the diaphragm casing 22 also acts as a fulcrum for the beam 28. It will be apparent that upon an increase in the pressure differential, the diaphragm 20 will deflect to the left and effect clockwise pivotal movement of the force beam 28 about the diaphragm 32.

The upper end of the force beam 28 carries a baffle 34 which in cooperation with a nozzle 36 forms a fluid pressure couple. The nozzle 36 is fixed relative to the baffle 34 and is connected by a pipe to a pneumatic amplifier 38.

In general, the amplifier 38 is supplied with air under pressure and is operative in response to a change in the spacing between the nozzle 36 and baffle 34 to produce a pressure output signal which is employed to produce a restoring force on the beam 28. When the baffle 34 is displaced relative to the nozzle 36, the change in flow from the nozzle 36 will vary the pressure in chamber 40 of the amplifier causing actuation of the valve means 42 to produce a corresponding change in pressure in conduit 44. While amplifier 38 may be of any suitable type which will produce a change in output pressure in response to a change in position of a fluid couple, I have chosen to illustrate the amplifier as being of the reset type and similar to that disclosed and claimed in copending application Serial No. 652,477 filed April 12, 1957, to Bruce H. Baldridge which issued March 14, 1961 as Patent No. 2,974,674, to which reference may be made for a detailed description.

The output pressure in conduit 44 is utilized indirectly through a spring 90 to produce a restoring force on the beam 28 which balances the force applied to the beam by the diaphragm 20. Thus, the magnitude of the output pressure in conduit 44 developed by the amplifier 38 is dependent on the force required to restore the beam 28 to its original position.

It will be apparent to those skilled in the art that while the description of the force balance system has referred to a balance of forces on the beam 28 for purposes of simplicity, such force balance systems actually involve a balance of torque. Thus, actually the input force to the beam 28 established by the diaphragm 20 produces a torque on the beam about the diaphragm 32 which is balanced by a torque produced by the restoring force produced by the bellows 70. The relative magnitude of the two forces at balance will depend on the relationship of their moment arms. The adjustability of a knife edge 50 enables the moment arm of the restoring force to be varied.

The restoring force is applied to the force beam 28 by means of a restoring beam 46 pivoted at 48 and engaging the knife edge 50 carried by the force beam 28. When actuated in a clockwise direction, the restoring beam will apply a force to the force beam at the position of the knife edge 50. Attached to the end of the restoring beam 46 is a calibrating spring 52 which through the provision of a suitable adjustment means (not shown) may be provided with a tension and/or compression adjustability. It has been customary in flow measuring systems of this general type to apply the output pressure of the amplifier directly to an expansible element engaging the restoring beam and then feed the output pressure into a motion balance system for extracting the square root. This arrangement has been unsatisfactory, however, as hereinbefore described. I have overcome the disadvantages of such prior art systems by applying the output pressure of the amplifier to an expansible element which positions the input beam of a motion balance system and applies a restoring force to the force balance beam by means of a yieldable connection between the input beam and restoring beam to thereby establish an input motion in the motion balance system proportional to the rebalancing force on the force beam.

Before turning to a specific description of the interconnection of the force balance system and motion balance system, attention is first directed to the particular structure of the motion balance system employed. The motion balance system is indicated generally by the reference numeral 56 and includes an input beam 58 which when actuated establishes an input motion which is balanced by the output motion of an output beam 60. The input beam 58 is pivoted at 62 having one arm 64 extending from the pivot 62 substantially parallel to the force beam 28 and restoring beam 46. The other arm 66 thereof extends from the pivot 58 perpendicular to the arm 64. The output beam 60 is pivoted at 68 and is positioned substantially perpendicular to the arm 66 of the input beam.

Motion is imparted to the input beam 58 by an expansible bellows 70 which is connected to the conduit 44 to have the interior thereof subjected to the output pressure developed by the amplifier 38. One end of the bellows 70 is mounted on a suitable fixed support while the movable end thereof engages the arm 64 of the input beam 58. It will be apparent to those skilled in the art that an increase in the output pressure of amplifier 38 will expand the bellows 70 positioning the beam 58 clockwise about the pivot 62.

A nozzle is carried by the end of the output beam 60 and cooperates with a flexible baffle 74 to form a fluid pressure couple similar to the couple 34, 36 associated with the force balance system. The baffle 74 is also carried by the output beam 60, but arranged to be deflected relative to the end of the nozzle. An abutment comprising a rod 78 is carried on the lower surface of the arm 66 and is normally engaged by an actuating rod 80 carried by the baffle 74. It will be apparent that if the arm 66 is deflected by pivotal movement of the input beam 58, the baffle 74 will be deflected relative to the nozzle 72.

The nozzle 72 is connected by a conduit 82 to an amplifier 83 which is of identical construction to that of the amplifier 38 and responsive to variations in pressure in the conduit 82 caused by variations in spacing between the nozzle 72 and baffle 74 to establish an output pressure in conduit 84.

An expansible bellows 86 having the interior thereof communcating with the conduit 84 is arranged to effect movement of the output beam 60 to restore the spacing between the nozzle 72 and baffle 74 in response to the output pressure developed in the conduit 84. Attached to the output beam 60 is a calibrating spring 88 which through the provision of suitable adjustment means (not shown) may be provided with tension and compression adjustability.

It will be apparent that when the baffle 74 is deflected relative to the nozzle 72, the amplifier 83 will respond to the variations in pressure in conduit 82 to increase (or decrease depending on the direction of displacement of the baffle) the pressure within the conduit 84 until the force of the bellows 86 on the beam 60 is sufficient to overcome the biasing force of the spring 88 and move the output beam 60 to a position wherein the spacing between the nozzle and baffle is restored. Thus, the input motion of the beam 58 is balanced by the output motion of the beam 60 and an output signal is developed in conduit 84 proportional to the output motion. The output pressure in conduit 84 may be supplied to a controller as for regulating the flow in conduit 10, or to an indicating means for manifesting the magnitude of the flow.

The particular relationship of the input beam 58 and output beam 60 is such that the motion of the latter is proportional to the square foot of the motion of the former, and thus the output pressure developed in conduit 84 is proportional to the square root of the pressure established across the diaphragm 20.

Referring to Fig. 2 it is to be noted that as the baffle 74 is actuated downward it is moved substantially perpendicular to the plane of the nozzle 72. On the other hand, the nozzle 72 to balance this motion of the baffle and restore the spacing of the couple moves along an arc of radius substantially equal to the length of the output beam 60. Thus, as illustrated in Fig. 2, if the input beam 58 is actuated to displace the baffle 74 a distance D, it will be apparent that the output beam 60 will move an angle θ to restore the spacing between the nozzle and baffle. For the purpose of clarity and illustration, these motions have been exaggerated in magnitude, the actual range of movements encountered being a small fraction of that indicated. It has been found that if the length of the beam 60 is taken as unity, the relationship of the motion may be expressed mathematically by the following equation:

$$D = 1 - \cosine \theta$$

When the above equation is solved for D at each two degrees of rotation of the output beam 60 over a 20° range, it is found that the motion of the output beam varied less than one quarter of one percent from a true square root relationship with the motion of the input beam 58. Thus, the output motion of the beam 60 is substantially proportional to the square root of the input motion of the beam 58, and the output pressure developed in conduit 84 has a linear relationship with the flow rate in conduit 10. For a more detailed and theoretical analysis of the movements discussed above, reference is made to copending application Serial No. 386,000 filed October 14, 1953 by Richard C. Hunter which issued December 15, 1959, as Patent No. 2,917,064 which discloses and claims a square root extractor employing this concept.

Referring now to the particular method of producing the motion of the beam 58, is will be apparent that the output pressure of amplifier 38 developed in conduit 44 will tend to expand the bellows 70 and effect clockwise rotation of the beam 58. This input motion to the motion balance system is determined by the force required to balance the force beam 28. More particularly, a coil spring 90 is connected between the restoring beam 46 and arm 64 of the input beam 58. It will be apparent that if the arm 64 is deflected toward the restoring beam 46, compression of the spring 90 will occur and a force will be applied to the force beam 28. The biasing force of the spring 90 on the restoring beam is proportional to the position of the arm 64, and accordingly, the magnitude of the balancing restoring force required on the force beam 28 will determine the position of the input beam 58 and the input motion balance system 56.

For illustration, assume that the diaphragm 20 is deflected to the left by an increase in the pressure differential across the restriction 12. This movement of the diaphragm will be transmitted to the force beam 28 through rod 30 effecting clockwise pivotal movement of the force beam about the diaphragm 32 and displacement of the baffle 34 to the right towards the nozzle 36. The amplifier 38 will respond to the increase in pressure in chamber 40 caused by movement of the baffle 34 to produce an increased output pressure in conduit 44 and expansion of bellows 70. This output pressure will increase until the beam 58 is actuated clockwise sufficiently to compress spring 90 and apply a force to force beam 28 through the restoring beam 46 of magnitude sufficient to restore the force beam to its original position. Accordingly, the position of the input beam and input motion to the motion balance system is directly proportional to the rebalancing or restoring force applied to the force beam 28.

The output beam 60 of the motion balance system will be actuated by the bellows 86 as previously described in proportion to the square root of the input motion to thereby establish an output signal in conduit 84 having a linear relationship with the flow rate sensed by diaphragm 20.

It will be noted that the input motion of the motion balance system is only dependent on the force required to balance the force beam 28. The input motion is independent of the output pressure signal of the force balance system resulting in maximum sensitivity and accuracy. Thus, the objects of the invention have been accomplished.

While only one embodiment of the invention has been herein shown and described, it will be apparent to those skilled in the art that many changes may be made in the construction and arrangements of parts without departing from the scope of the invention as defined in the appended claims.

What I claim as new and desired to secure by Letters Patent of the United States, is:

1. A device for establishing a signal representative of a variable, comprising a force balance system including a beam adapted to be displaced by a force proportional to the magnitude of the variable to develop an output signal, a motion balance system including a first member movable in response to said output signal from said force balance system and a second member movable to balance the motion of said first member and to establish an output signal proportional to the balancing movement, and a yieldable connection between said first member and said force balance beam to apply a restoring force to said force balance beam upon movement of said first member, the position of said first member and output signal from said motion balance system being directly proportional to the restoring force applied to said force balance beam.

2. A device for establishing a final output signal having a non-linear relationship to the magnitude of a variable, comprising, a force balance system including a beam adapted to be displaced by a force proportional to the magnitude of the variable to develop an intermediate output signal, a motion balance system including a first member movable in response to said intermediate output signal, a second member movable to balance the motion of said first member to establish a final output signal, means responsive to the final output signal for establishing a non-linear relationship between the motions of said first and second members so that the final output signal has a non-linear relationship with the motion of said first member, and a yieldable connection between said first member and said force balance beam to apply a restoring force to said force balance beam upon movement of said first member, the restoring force applied to said force balance beam being directly proportional to the position of said first member and the intermediate output signal.

3. A transmitting device as claimed in claim 2 wherein said yieldable connection comprises a coil spring.

4. A differential pressure transmitter responsive to a differential pressure proportional to the square of a flow in a conduit, comprising a force balance system including a beam adapted to be actuated by a force representative of the differential pressure to develop an output signal, a motion balance system including a first member movable in response to said output signal from said force balance system and a second member movable to balance the motion of said first member and to establish an output signal from said motion balance system proportional to said balancing movement, a spring connection between said force balance beam and said first movable member to apply a restoring force to said force balance beam upon movement of said first member, the position of said first member being directly proportional to the restoring force applied to said force balance beam, and means associated with said motion balance system for effecting a square root relationship between the balancing motion of said second member and the motion of said first member to thereby establish an output signal from said motion balance system having a linear relationship with the flow rate.

5. A differential pressure transmitter comprising, a casing, a force balance beam pivotally mounted on said casing, a pressure sensitive element in said casing and responsive to a pressure differential proportional to the flow rate of a fluid for applying a force to said force balance beam tending to effect pivotal movement of the same, a first pneumatic system including a first nozzle and baffle fluid couple associated with said force balance beam to undergo relative movement upon movement of said beam, a first pneumatic amplifier connected to said nozzle for establishing an output pneumatic pressure proportional to the relative positions of said nozzle and baffle, a second pivotal beam, and expansible element responsive to the output pressure of said amplifier for effecting pivotal movement of said second beam, a spring connection between said second beam and said force balance beam effective to apply a balancing force to said force balance beam proportional to the position of said second beam, a second pneumatic system including a second nozzle and baffle couple and a second pneumatic amplifier, a third pivotal beam forming with said second beam and said second pneumatic system a motion balance system, said third beam being movable in response to the output pressure of said second pneumatic system to balance movement of said second beam, and means for characterizing the balancing movement of said third beam to effect a square root relationship between the movement of said third beam and said second beam.

References Cited in the file of this patent

UNITED STATES PATENTS

| | | |
|---|---|---|
| 2,332,627 | Erbguth | Oct. 26, 1943 |
| 2,354,423 | Rosenberger | July 25, 1944 |
| 2,408,685 | Rosenberger | Oct. 1, 1946 |
| 2,451,425 | Allwein | Oct. 12, 1948 |
| 2,672,151 | Newbold | Mar. 16, 1954 |

OTHER REFERENCES

Automatic Control, Holzbock, Reinhold Publishing Corporation, copyright 1958, pages 136 and 144.